US006157766A

United States Patent [19]

Laniepce et al.

[11] Patent Number: 6,157,766

[45] Date of Patent: Dec. 5, 2000

[54] HIGH-DENSITY AND HIGH-CAPACITY DISTRIBUTION FRAME FOR OPTICAL FIBERS

[75] Inventors: Sylvie Laniepce, La Graverie; Anne-Marie Blanchard, Pleumeur Bodou; Jean-Jacques Gueguen, St Quay-Perros, all of France

[73] Assignee: Frances Telecom, Paris, France

[21] Appl. No.: 09/094,632

[22] Filed: Jun. 15, 1998

[30] Foreign Application Priority Data

Jun. 20, 1997 [FR] France .................................. 97 07892

[51] Int. Cl.$^{7}$ ...................................................... G02B 6/36

[52] U.S. Cl. ............................................ 385/134; 385/135

[58] Field of Search ..................................... 385/134–137

[56] References Cited

U.S. PATENT DOCUMENTS 4,765,710 8/1988 Burmeister et al. .................... 385/134
5,353,367 10/1994 Czosnowski et al. .................. 385/135
5,825,962 10/1998 Walters et al. .......................... 385/135
5,946,440 8/1999 Puetz ...................................... 385/135

FOREIGN PATENT DOCUMENTS 7-318820 8/1995 Japan .
7-244225 9/1995 Japan .
7-333530 12/1995 Japan .
7-333531 12/1995 Japan .

*Primary Examiner*—Hemang Sanghavi
*Attorney, Agent, or Firm*—Laubscher & Laubscher

[57] ABSTRACT

A distribution frame for optical fibers comprises, for example, two elementary distribution frames in each of which supports are provided to support rows of optical fiber connection modules which, in an inclined rest position, are distributed in a matrix arrangement to connect ends of first optical fibers to ends of connecting optical fibers. To make a connection relating to a module supported by the support, the support rotates about a rotation shaft parallel to two sides of the matrix in a vertical plane, out of the mass of connecting optical fiber ends.

10 Claims, 9 Drawing Sheets

HIGH-DENSITY AND HIGH-CAPACITY DISTRIBUTION FRAME FOR OPTICAL FIBERS

BACKGROUND OF THE INVENTION

1. Field of the Invention

The present invention concerns a high-density and high-capacity distribution frame, in particular for optical fibers, used as an optical distribution frame for user optical fibers, or as a sub-distribution frame.

2. Description of the Prior Art

An optical distribution frame is a device essentially assuring optical continuity in a way that is totally flexible and can be modified between ends of first optical fibers, for example optical fibers of underground network cables, and ends of second optical fibers, for example fibers coming from user equipments of a telephone central office. The distribution frame therefore enables unlimited fiber-to-fiber modification of the assignments between first fibers and second fibers defined at the time of initial wiring (cross-connect function) and cancelling such assignments temporarily or permanently (delay function), on a fiber by fiber basis. In the context of expanding use of fiber optics in distribution networks, it has become necessary to design high-capacity optical distribution frames and to achieve densities in optical technology comparable with those already achieved in traditional distribution frames for copper telephone lines.

In a matrix architecture optical distribution frame connection modules, also known as connectors, are arranged in a plane matrix. The ends of the first optical fibers are fed in through one of faces of the distribution frame in a fixed manner. The ends of the second optical fibers can be moved over the other face of the matrix distribution frame during cross-connection operations (NTT Japanese patent applications Nos. 07-318,820, 07-244,225, 07-333,530 and 07-333,531).

There are two variants of matrix distribution frames, a single-stage variant and a two-stage variant.

In the single-stage variant the first fibers, which are network fibers, for example, are fed to one face of the matrix and the second fibers, which are fibers from user equipments, for example, are fed to the other face of the matrix. During cross-connection operations the ends of either the network fibers or the equipment fibers are mobile; in other words they can be withdrawn from the connection modules and inserted into them.

In the two-stage variant the stages are two matrices. One face of each matrix receives the network fibers or the user equipment fibers. Optical continuity between the network fibers and the equipment fibers is assured by separate fibers, known as connecting fibers, disposed between the two matrices. The connecting fibers are moved during cross-connection operations.

The connection matrix can be associated with an organization panel or an alignment strip which organizes the optical fibers reaching the face of the matrix in a spatial manner that cannot be changed, regardless of subsequent cross-connection operations. The panel includes a matrix of holes through which respective optical fibers pass. The movements of optical fibers associated with cross-connection operations and the associated crossovers of the fibers take place between the organization panel and the connection module matrix.

A cross-connection operation is essentially effected by carrying out three basic operations in succession:

disconnecting one optical fiber end in a connection module at the face of the matrix;

extracting the optical fiber from the organization panel by pulling it through the mass of crossing fibers between the connection module matrix and the organization panel, the function of the latter being to enable identification of the optical fibers to be extracted; and pulling the optical fiber extracted from the organization panel towards the connection module to be connected, passing it over the existing mass of crossing optical fibers.

In these prior art distribution frames the matrix organization of the connection modules makes access to them difficult, since to reach a connection module it is necessary to thread the hand or a tool through the curtain formed by the fiber ends terminating at the matrix. This operation is even more difficult if the density of connection modules is high. This "infiltration" through the curtain of fiber ends is also necessary for carrying out maintenance on the connection modules.

Furthermore, the presence of the organization panel makes it necessary to pull an optical fiber to be disconnected or disconnected/connected through all of the mass of optical fibers between the matrix and the organization panel, and then to pull another optical fiber from and through the organization panel, if necessary, and then across all the other surrounding optical fibers between the panel and the matrix. As the fibers are neither changed nor trimmed in length during cross-connection, they must be sufficiently long to enable the fiber ends to be connected to near and far away connection modules in the matrix.

In the case of a low-density distribution frame the connecting optical fibers often have highly disparate and excessive lengths, which rules out interchanging connection optical fibers during cross-connection operations. This disparity is more serious if the connection modules are relatively widely spaced from each other, i.e. if their density is relatively low, and if the matrices have increasingly large dimensions in order to increase their capacity.

OBJECT OF THE INVENTION

The main object of this invention is to provide an optical fiber distribution frame in which the ends of the optical fibers to be cross-connected are more easily accessible than in prior art matrix distribution frames.

SUMMARY OF THE INVENTION

Accordingly, a distribution frame for optical fibers comprising connection modules distributed in a matrix arrangement to connect ends of first optical fibers to ends of second optical fibers and supports for supporting respective rows of connection modules extending parallel to two sides of the matrix, is characterized in that the supports have first ends rotatably mounted about a rotation shaft parallel to the other two sides of the matrix.

Thus the distribution frame of the invention is in the form of a matrix formed by the rows of connection modules, in practise constituting columns of the matrix, which are independent of each other, above the rotation shaft. A connection module support containing a connection module for optical fiber ends to be cross-connected can be removed from the plane of the matrix simply by rotating it about the rotation shaft from a rest position to a working position without disturbing the optical fibers which are connected to the connection module supported by the support and without being impeded by the other optical fibers terminating at the matrix.

Each support comprises at least one row or even two rows of connection modules, allowing easy lateral access to the connection points at which the optical fibers are connected two by two. This ease of access is related to the rotational mounting of the connection module supports, compatible with a high-density organization of miniaturized connectors, allowing pitches of a few millimeters between connection points to be achieved.

To preserve the stiffness of the connection module supports, there are provided parallel circular arc shape guides centered on the rotation shaft or parallel rectilinear guides for guiding second ends of the connection module supports sliding between two abutments, preferably crossbeams perpendicular to the guides. Alternatively, the guides can be parallel rectilinear. Preferably, one of the abutments and the rotation shaft are substantially located in one side of the distribution frame corresponding to the working position, which is vertical, for example. Thus all the supports are set back from the vertical plane except for the support which has been withdrawn from the matrix by rotating it about the rotation shaft and which is in the vertical plane for connecting/disconnecting optical fiber ends or carrying out maintenance on a connection module of the support without disturbing other neighboring optical fibers.

To prevent tangling of optical fibers associated with neighboring supports and also tangling of optical fibers in front of the connection module matrix, partitions are fixed to the distribution frame structure or, in a different embodiment, are attached to respective connection module supports. The partitions are provided between circular sectors swept by the supports of connection modules when they turn about the rotation shaft.

The distribution frame comprises a roller parallel to the rotation shaft and near the latter. This roller is mainly useful when the optical fibers to be cross-connected drop below the distribution frame, particularly if these optical fibers are connecting fibers in a two-stage distribution frame. The roller avoids excessive flexing of the optical fibers due to the weight of optical fibers above them so that they retain a radius of curvature greater than the minimum permissible radius of curvature.

Each connection module is preferably mounted so as to be removable. In this case, each connection module support includes housings aligned perpendicularly to the rotation shaft and shaped for removably fixing respective connection modules therein. The connection modules can be small individual connection modules for connecting two optical fibers ends. In another variant, each connection module is a collective connection module for connecting first optical fiber ends to second optical fiber ends two by two, for example four, eight or twelve optical fiber pairs. A connection module support of the above kind is compatible with any type individual connector, i.e. fiber by fiber, or collective connector, i.e. for groups of fibers such as cables, or semi-collective connector, by which is meant a connector which is collective on one face of the matrix and individual on the other face of the matrix.

The invention also concerns a high-capacity two-stage distribution frame. Such a distribution frame for optical fibers comprises a first distribution frame including connection modules distributed in a matrix arrangement to connect ends of first optical fibers to first ends of connecting optical fibers, and a second distribution frame including connection modules distributed in a matrix arrangement to connect ends of second optical fibers to second ends of the connecting optical fibers, and is characterized in that each of the first and second distribution frame comprises connection module supports for supporting respective rows of connection modules parallel to two sides of the respective matrix and having first ends rotatably mounted about a rotation shaft parallel to the other two sides of the respective matrix.

If the first and second distribution frames are spaced apart substantially in a horizontal plane, a strip is suspended between the first and second distribution frames and disposed substantially below the rotation shafts to support the connecting fibers.

Furthermore, the distribution frame can comprise a working plate, preferably removable or hinged along one side, extending over the strip carrying the connecting fibers.

The high-capacity distribution frame is made in a structure made up of beams, uprights and crossbeams substantially delimiting two parallelepiped-shape blocks containing the first and second distribution frames, respectively, and a central third parallelepiped-shape block resting on the floor, in which the connecting optical fibers extend and which is located between the two parallelepiped-shaped blocks.

The distribution frame is enclosed in a casing having at least one door providing direct access to an intermediate space located between the first and second distribution frame units and containing the connecting optical fibers.

Each of the first and second distribution frames can comprise an abutment which delimits an end of travel of the supports and which is substantially coplanar with the rotation shaft in one side of the distribution frame which can be vertical, inclined or horizontal depending on the possibilities of access to the distribution frame determined at the time of its installation. The working planes corresponding to the working positions in the first and second distribution frames are directly face-to-face, for example.

BRIEF DESCRIPTION OF THE DRAWINGS

The foregoing and other objectives, features and advantages of the invention will be apparent from the following detailed description of several embodiments of the invention with reference to the corresponding accompanying drawings in which.

DESCRIPTION OF THE PREFERRED EMBODIMENTS

Figure 1:
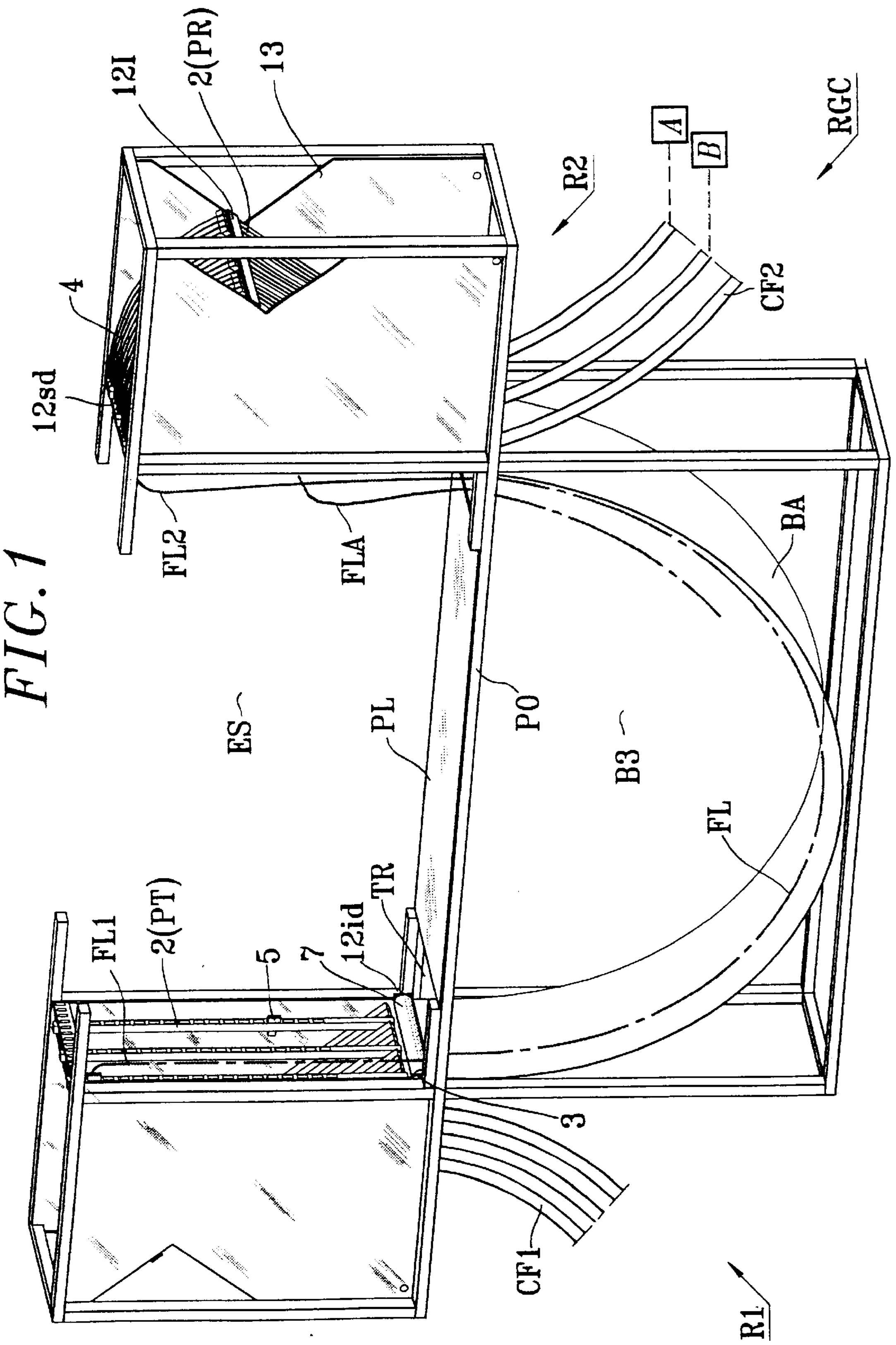
FIG. 1 is a diagrammatic perspective view of a distribution frame accordance with the invention, of the type with elementary first and second distribution frame, as seen from the front.

Referring to FIG. 1, a high-capacity distribution frame RGC is constructed from metal structure of beams, uprights and crossbeams which essentially delimit first, second and third parallelepiped-shape blocks. The first and second parallelepiped-shape blocks of the structure constitute elementary matrix distribution frames R1 and R2 of the one-stage type in accordance with the invention located to the left and to the right of the structure and in the upper part thereof.

The third parallelepiped-shape block B3 of the structure is located in the central part of the latter at a lower level than the first and second distribution frames R1 and R2 and between them. It provides a base on the floor for the high-capacity distribution frame. Connecting optical fibers FL occupy the paralleepiped-shape block B3. First ends FL1 of the connecting optical fibers are to be connected via the first distribution frame R1 to ends of first optical fibers of cables CF1, such as optical fibers included in cables of an underground fiber optic network. Second ends FL2 of the connecting optical fibers are to be connected via the second distribution frame unit R2 to ends of second optical fibers of cables CF2, such as optical fibers connecting individual user equipments. The structure of the high-capacity distribution frame RGC therefore has a plane of symmetry which, in the example illustrated, is vertical and coincident with the transverse median plane of the parallelepiped-shape block B3 of the parallelepiped-shape space ES between the first and second elementary distribution frame. Because of this symmetry, the first elementary distribution frame R1 is identical to the second elementary distribution frame R2 and is the only one described in detail below.

Figure 2:
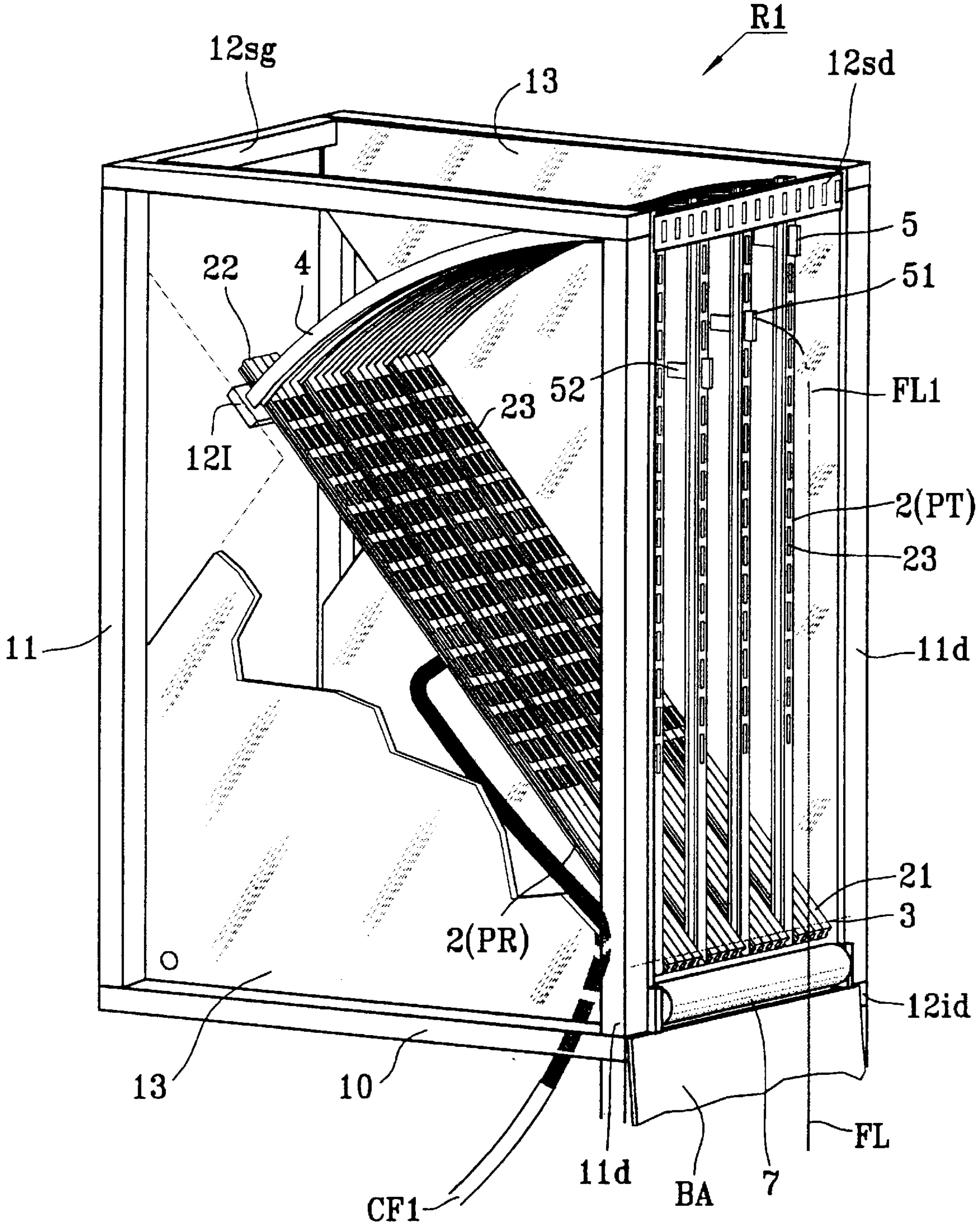
FIG. 2 is perspective view of the front face of the first elementary distribution frame for network optical fibers, as seen from the front side, according to a first embodiment of the invention.
Figure 3:
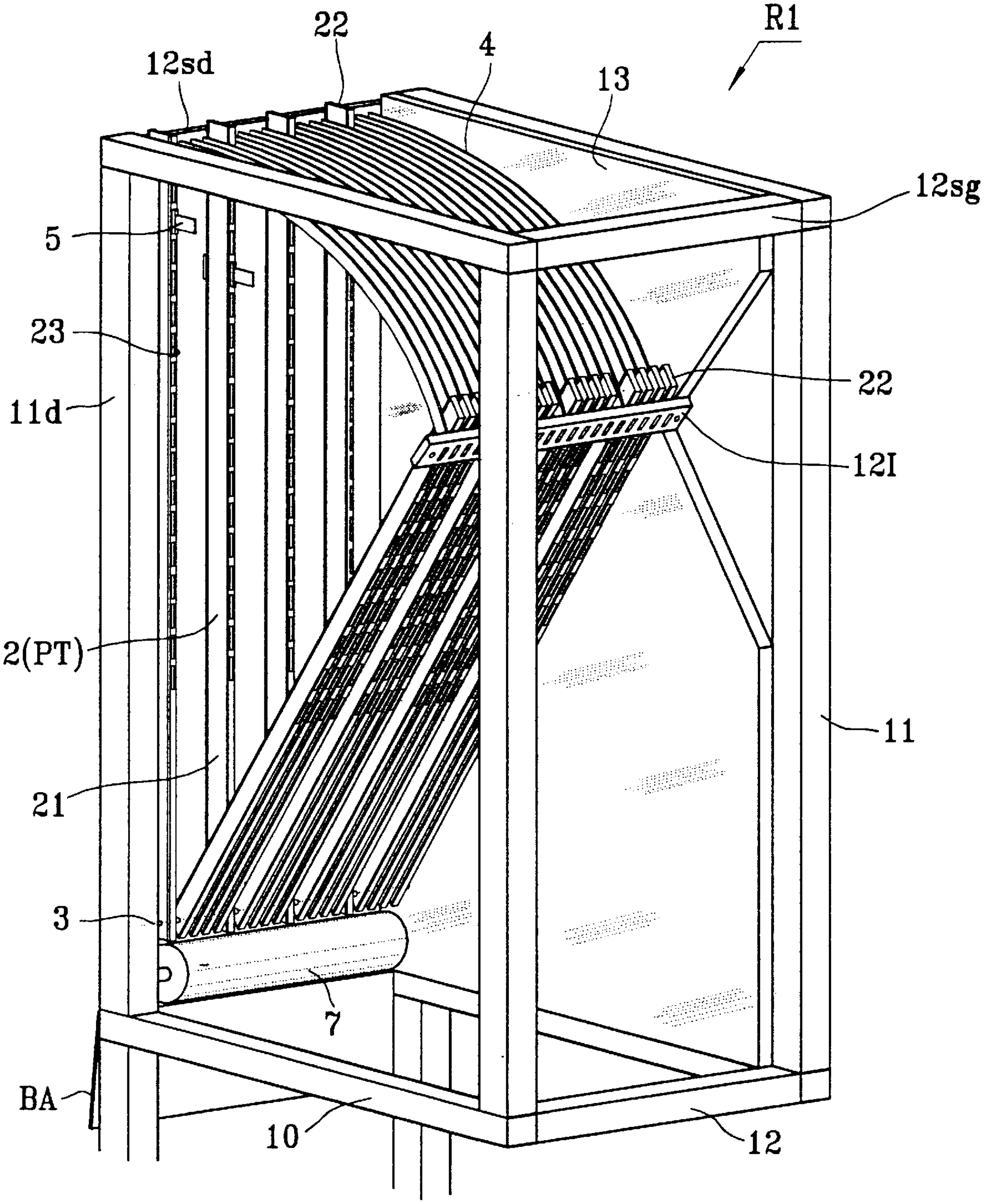
FIG. 3 is perspective view of the rear face of the first distribution frame, as seen from the rear.
Figure 4:
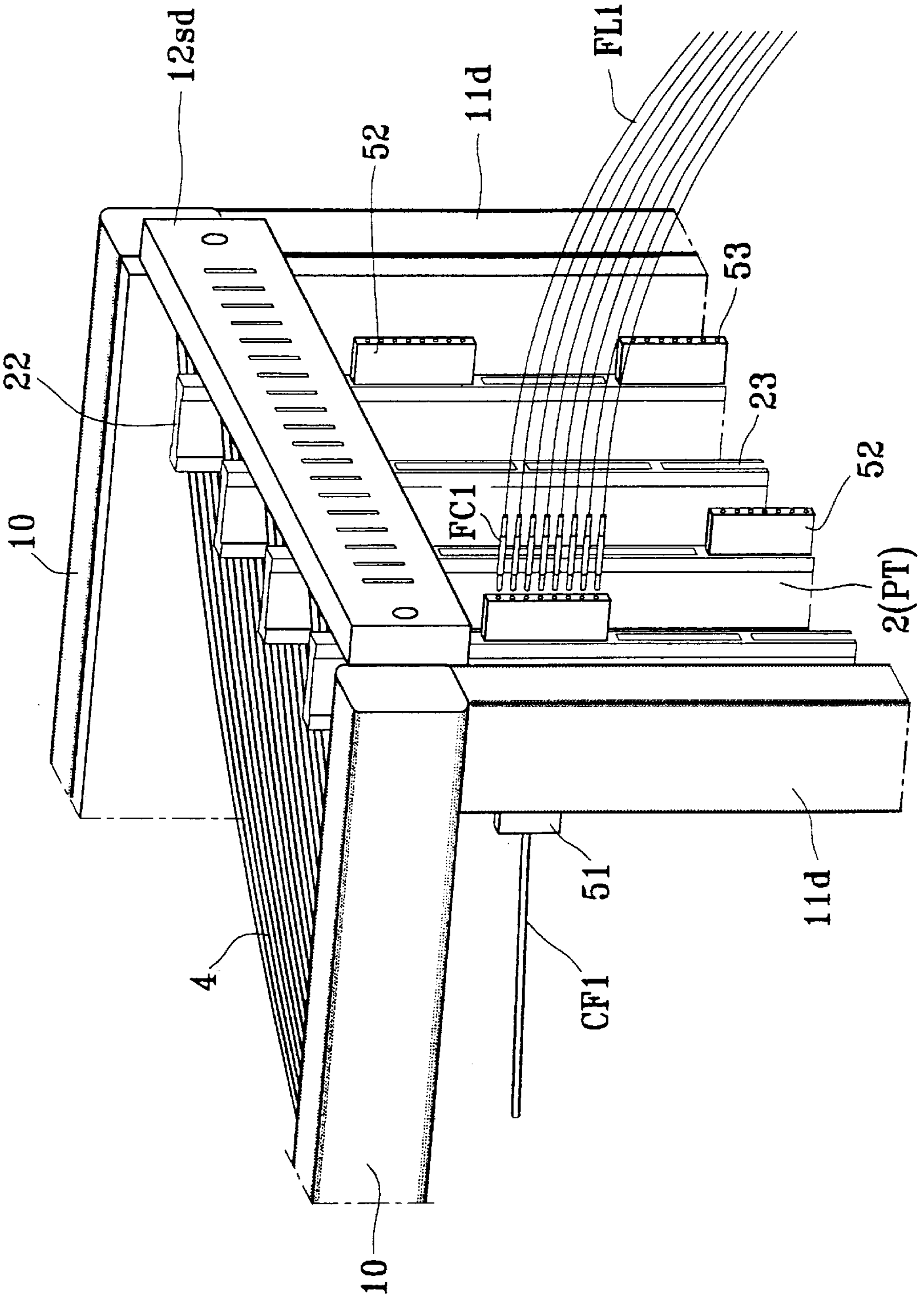
FIG. 4 is a perspective detail view similar to FIG. 2 showing module supports in a working position inside the first distribution frame.

Referring to FIGS. 2, 3 and 4, the elementary matrix distribution frame R1 has a parallelepiped-shape structure conventionally comprising four beams 10, four uprights 11 and four crossbeams 12, together with two support plates 13 disposed on faces which are vertical in the illustrated embodiment example of the structure.

Plural connection modules supports 2 in the form of parallel shaped bars having a length substantially less than that of the uprights 11 of the distribution frame are disposed between the two support plates 13. The bottom ends 21 of the supports 2 pivot about a fixed rotation shaft 3 which is forcibly inserted transversely between the support plates 13 at the lower level of the two uprights 11*d* on the righthand side of the distribution frame and above the righthand bottom crossbeam 12id of the distribution frame structure bordering the central intermediate space ES. Parallel circular arc rails 4 centered on the rotation shaft slide through second ends 22 of the supports 2. First ends 41 of the rails 4 are fixed to the top crossbeam 12sd on the righthand side of the distribution frame. Second ends 42 of the rails 4 are fixed to an intermediate crossbeam 12I between the support plates, slightly below the lefthand top crossbeam 12sg of the distribution frame.

In a different embodiment the parallel rails are rectilinear, and the second end 22 of each support has a sufficiently long slot through which the respective rail 4 passes for the support to be able turn about the rotation shaft 3.

Accordingly, each support 2 sweeps a circular sector, typically subtending an angle of about 45°, between a vertical working position PT and an inclined rest position PR. In the working position PT the second end 22 of the support abuts against the righthand top crossbeam 12sd. In the rest position PR the second end 22 of the support abuts against the intermediate crossbeam 12I. In FIGS. 2, 3 and 4, for example, just four supports are in the working position and therefore situated in the side of the distribution frame R1 adjoining the space ES between the distribution frames R1 and R2.

Each support 2 includes holes 23 aligned perpendicularly to the rotation shaft 3 and equally spaced in the longitudinal direction from the second end 22 of the support to a lower area with no holes above the first end 21 of the support. Each hole 23 is a housing with the same shape as a flat connection module 5 which can be T-shape as in the embodiment illustrated, or rectangular.

Figure 5:
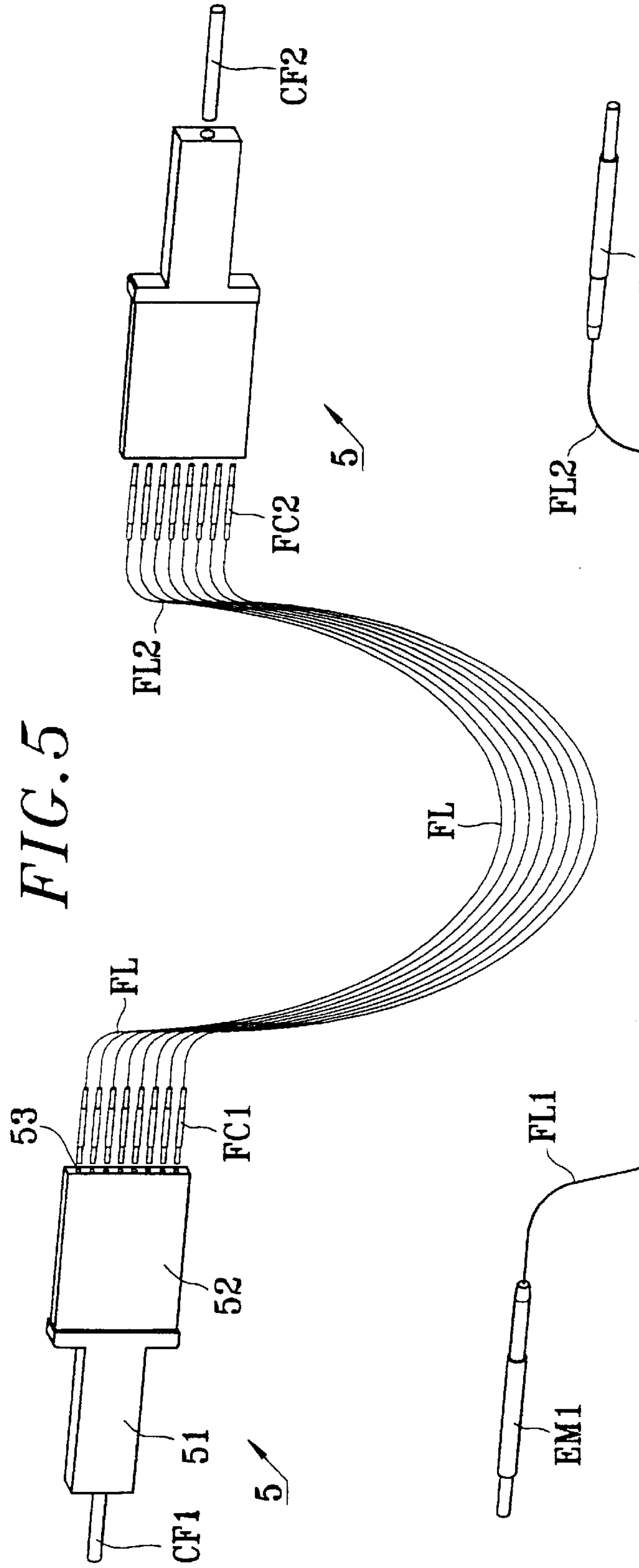
FIG. 5 is a diagrammatic view showing a connection between a first optical fiber cable, on the network side and a second optical fiber cable, on the user equipment side, via respective connection modules in the first and second elementary distribution frames and the connecting optical fibers.
Figure 6:
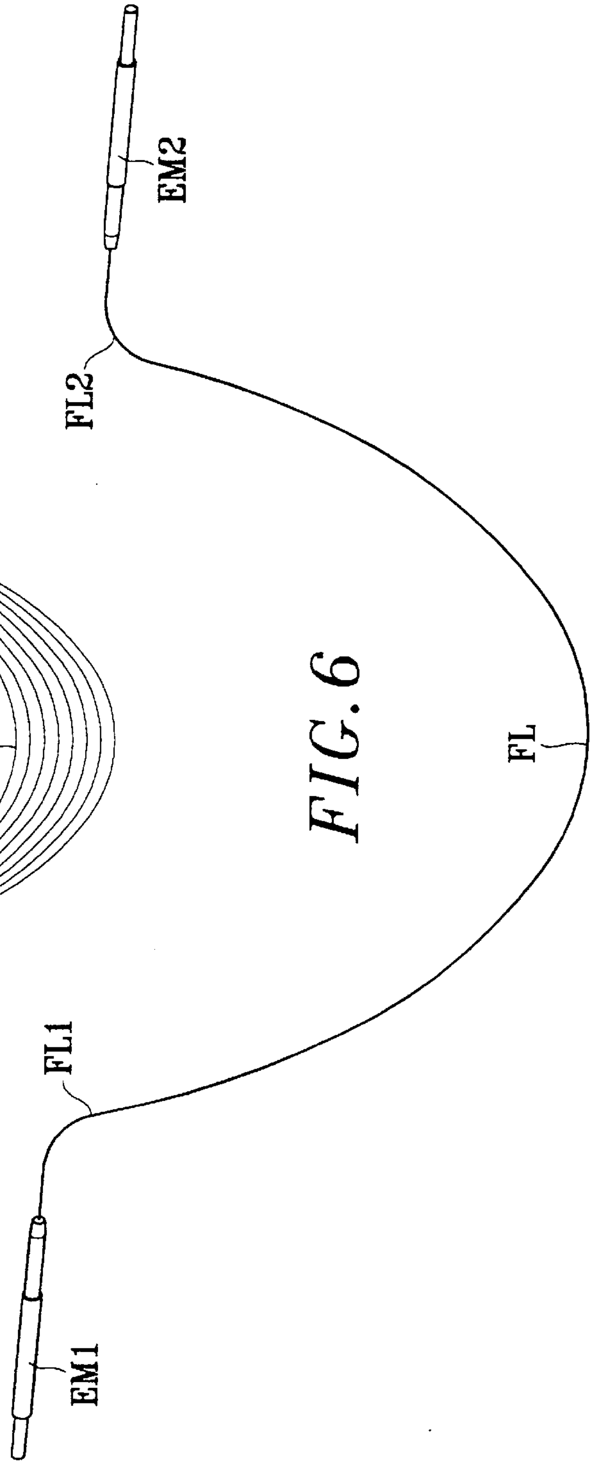
FIG. 6 shows a connecting fiber with clip-on connection plugs.

In the embodiment shown in FIGS. 5 and 6 the leg 51 of the Tee of the module 5 is in the form of a flat rectangular strip which extends towards the left to receive one end of a cable of first optical fibers CF1 of flexible microsheath type or, in a different variant, a first optical fiber ribbon cable. For example, each cable comprises 4, 8 or 12 optical fibers. The two branches 52 of the T-shape profile of the connecting module 5 constitute a thin parallelepiped which is nested in a socket of the leg 51. The righthand side of the branches 52 comprises longitudinal holes 53 to which can be clipped connecting plugs FC1 at the first ends FL1 of the connecting optical fibers FL. The holes 53 are typically spaced at a pitch of a few millimeters. As an alternative to this, each connection module can connect a first optical fiber to a connecting optical fiber. The number of connecting optical fibers that can be connected in a connection module is always equal to the number of first optical fibers contained in the cable CF1 entering the connection module from the left. As explained below, connecting plugs FC2 at the second ends FL2 of the connection fibers also clip into other connection modules 5 that can be plugged into the second distribution frame R2, in order to connect them to second optical fiber cables CF2 connected to user equipments and thereby to connect first optical fibers from the underground network to second optical fibers connected to respective user equipments.

Reverting to the situation shown in FIGS. 2 to 4, which are given by way of example, the lefthand parts of the branches 52 of the connection modules 5 are inserted into rectangular holes 23 in the support. When all the supports 2 are abutted against the righthand top crossbeams 12sd and so form a straight side of the distribution frame R1 or when both supports 2 are abutted against the intermediate crossbeam 12I towards the left, all the connection modules 5 in the supports form a matrix for connecting the ends of the first fibers of network to first ends of the connecting fibers. The matrix has horizontal rows of modules parallel to the rotation shaft 3 and to the crossbeams 12sd, 12I and columns of modules formed by the supports 2, some vertical, some oblique at substantially 45°.

As can be seen in FIG. 2 there are no holes 23 in the lower part each support 2. This avoids stressing a connecting optical fiber whose connecting plug FC1 must be plugged into a hole 23 on a lower matrix row in the distribution frame R1, to be curved towards the intermediate space ES between the distribution frames R1 and R2 along an arc the radius of which is less than the minimum acceptable radius of curvature for optical fibers.

The optical fibers leaving each cable CF1 follow a respective curve with the minimum radius of curvature for the fibers from an attachment point at the rear of the support nearest the rotation shaft 3. The attachment point under the support constitutes a substantially fixed point during rotation of the supports, avoiding the need for fiber "slack" to allow the supports to move.

In practise the ends of the first optical fibers in the network cables CF1 are plugged once and for all into the respective connection modules 5, although it is always possible to extract a first optical fiber end, for example to facilitate maintenance of the corresponding connection module. only the connecting plugs FC1 at the ends of the connecting optical fibers FL can be withdrawn and repositioned in the connection modules to modify the connections between the first fibers and the second fibers connected to the user equipments. If none of these operations is required, all of the connection module supports 2 are placed in the rest position PR with their upper ends 22 abutted against the intermediate crossbeam 12I. After pulling it towards the right about the rotation shaft 3, as shown in FIGS. 2 and 4, a support 2 is positioned on the righthand side of the distribution frame R1, in the working position PT, in order to disconnect and/or connect at least one connecting fiber connection plug FC1. During rotation of the support 2 from the rest position PR towards the working position PT or from the working position towards the rest position the support 2 is guided by the rail 4 the ends 41 and 42 of which are fastened to the two abutment crossbeams 12sd and 12I. The rail also prevents the support from buckling under the weight of the connection modules.

Figure 7:
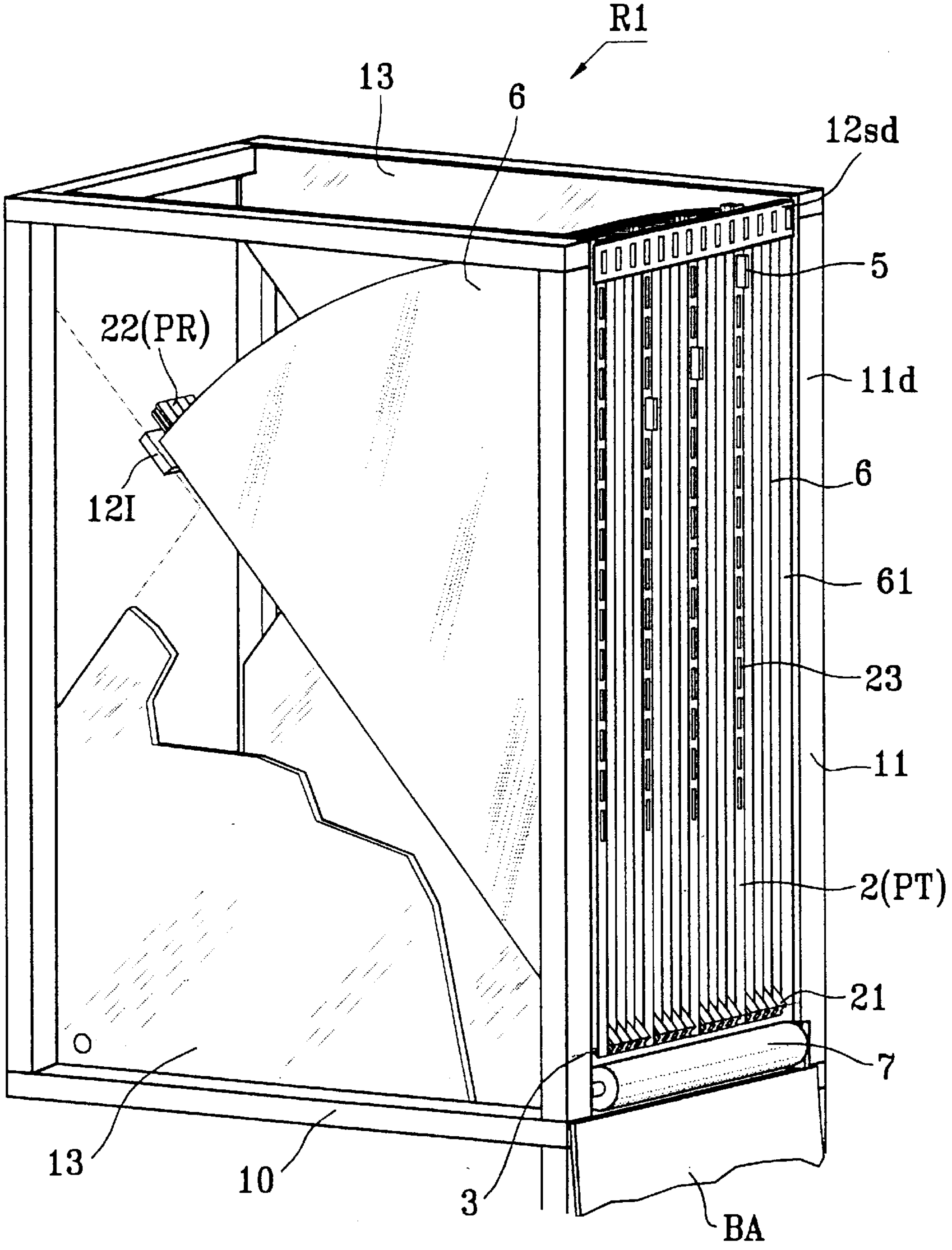
FIG. 7 is a view analogous to FIG. 2 of the first distribution frame constituting a second embodiment of the invention provided with partitions for guiding fibers between circular sectors in which the connection module supports pivot.
Figure 8:
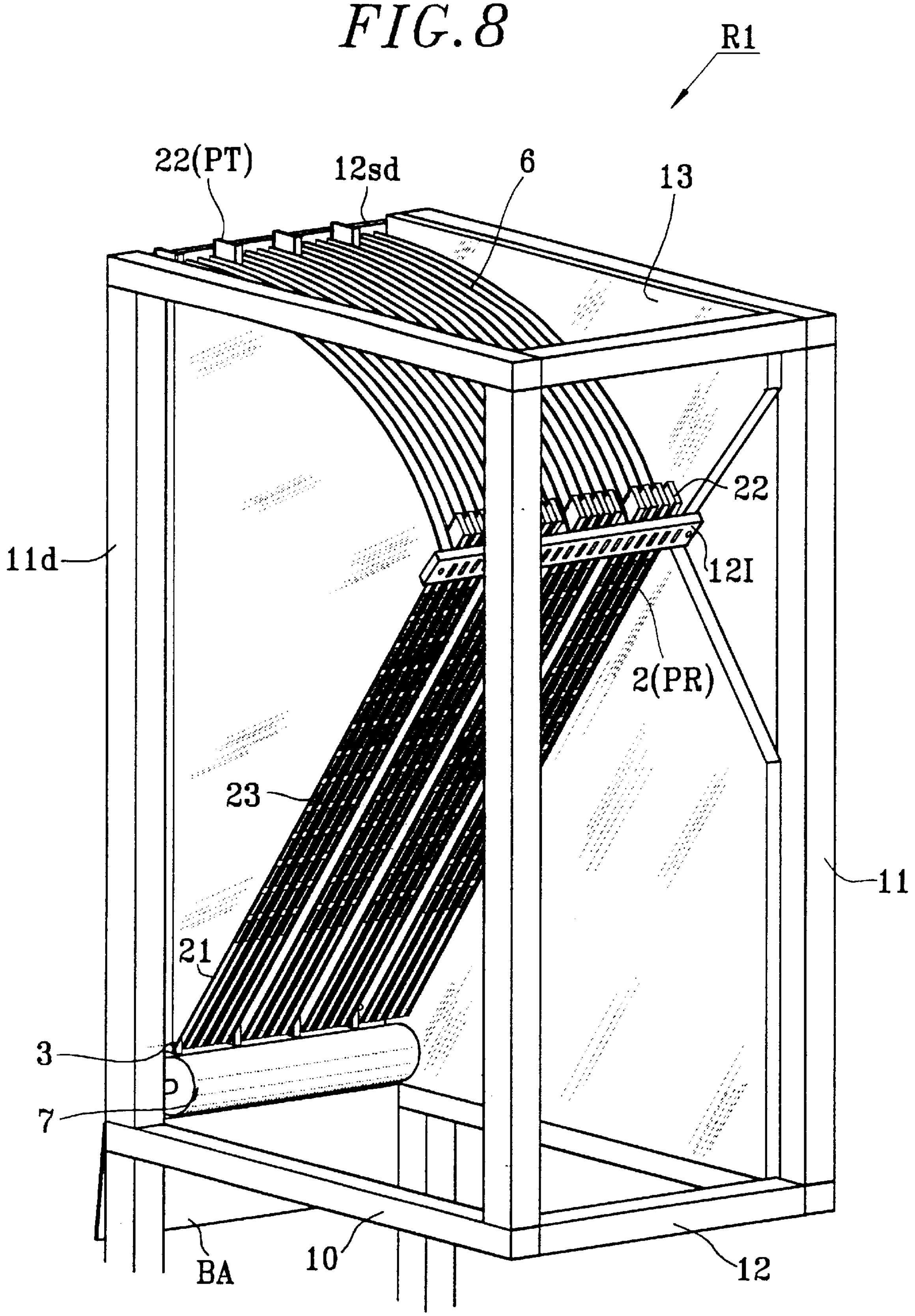
FIG. 8 is a perspective view analogous to FIG. 3 of the first distribution frame when provided with partitions as in the second embodiment.

In a second embodiment of the invention shown in FIGS. 7 and 8 the elementary distribution frame R1 comprises partitions 6 for separating the rotation sectors 61 to be swept by the connection module supports 2. The partitions 6 form a comb whose teeth extend from the rotation shaft 3 along a circular sector subtending an angle of substantially 45° between the two abutment crossbeams 12sd and 12I. The rotation shaft 3 passes through the lower end of each partition. The two top ends of each partition are fixed perpendicularly to the abutment crossbeams 12sd and 12I in the embodiment example shown. In another embodiment the lefthand edges of the partitions are respectively fixed along predetermined right or left edges of the supports 3, the partitions turning with the supports around the rotation shaft 3. Two neighboring partitions prevent tangling of the connecting fibers whose connection plugs FC1 are plugged into modules 5 supported by the associated support 2 that pivots between said partitions, with connecting fibers terminating in the other supports 3, and tangling of the corresponding first fiber ends CF1.

A fixed or freely rotatable transverse roller 7 is mounted on a fixed shaft in the lower part of the two uprights lid on the righthand side of the distribution frame between the rotation shaft 3 and the bottom righthand cross beam 12id of the distribution frame R1. The surface of the roller 7 projects slightly from the righthand side of the elementary distribution frame R1 to support the connecting fibers FL and to take the load due to the weight of the connecting fibers leaving connection modules 5 included in the distribution frame R1. Additionally, the roller 7 guarantees the minimum radius of curvature of the connecting fibers FL on leaving the connection modules, especially those in the lower part of the supports 2 subject to the weight of the other connecting fibers. The roller also guides the connecting fibers.

Returning to FIG. 1, the third parallelepiped-shape block B3 in the lower part of the high-capacity distribution frame RGC contains a flexible strip BA the ends of which are fixed to the bottom crossbeams 12id of the distribution frames R1 and R2 so that the strip is suspended between the distribution frames R1 and R2 as far as a point near the floor. The flexible strip BA, which can be a rubber strip, a net or a strip of woven fabric, forms a "hammock" to receive the connecting fibers FL, which follow its shape. The suspended strip BA also supports the length of connecting fiber needed for cross-connection operations and any connecting fibers awaiting connection.

For example, an elementary distribution frame R1 (or R2) for connecting 10,080 first optical fibers in network cables CF1 (or second fibers in user equipment cables CF2) to connecting fibers FL comprises approximately 84 supports 2 equipped with 15 connection modules for connecting eight connecting fibers, i.e. at most 120 connection points per support. The elementary distribution frame has a height of 90 cm, a face length of 65 cm and a side width of 1.25 m. The distribution frame RGC has a length of 2.5 meters and a height of 1.90 meters. The intermediate space ES between the distribution frames R1 and R2 above the strip BA carrying the connecting fibers FL contained in the block B3 of height 1 m then has a length of approximately 1.2 m.

Figure 9:
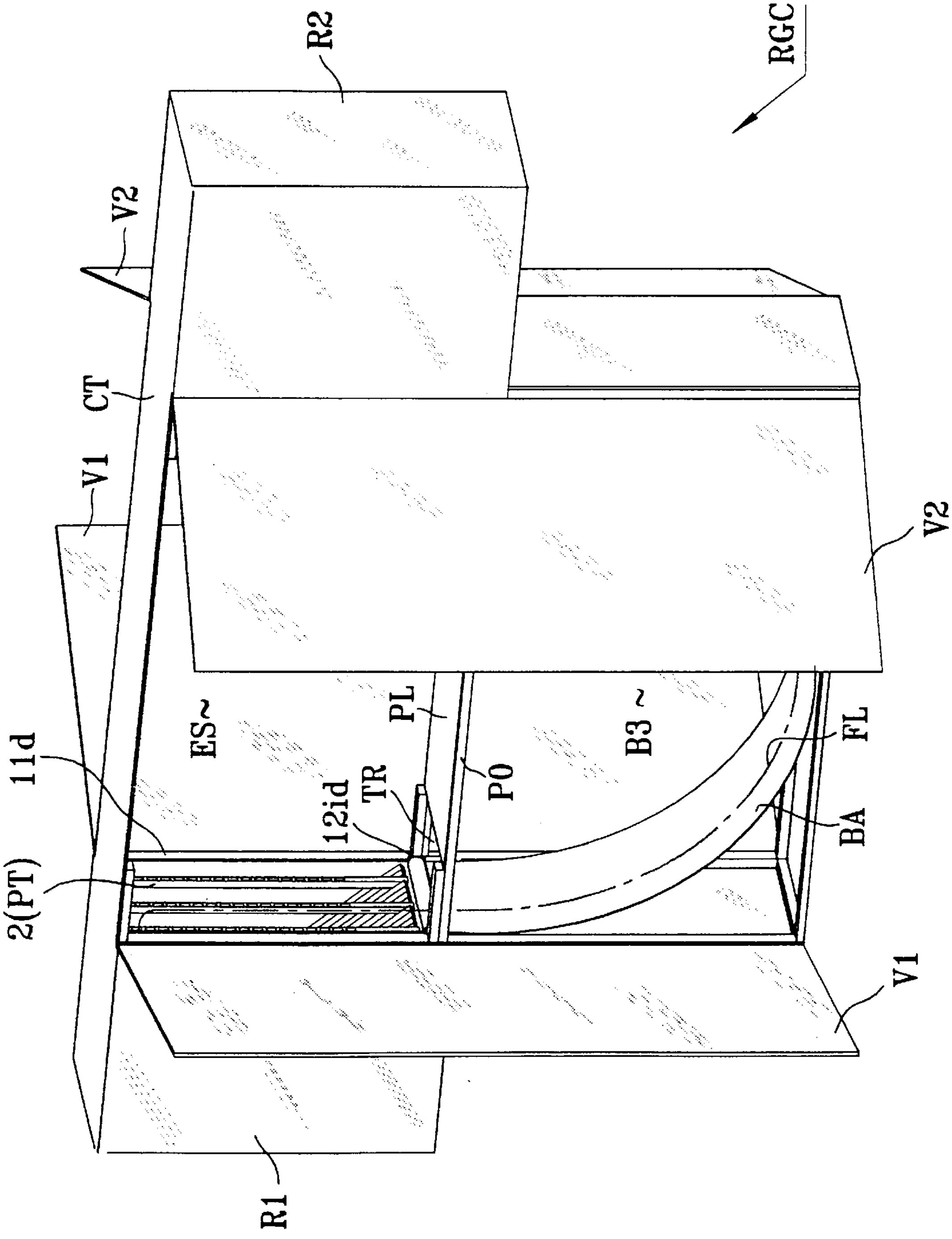
FIG. 9 is a perspective view of the casing of the distribution frame as a whole with its access doors open.

As shown in FIG. 9, the distribution frame RGC is protected by a removable sheet metal casing CT having a double door V1–V2 on each of its front and rear faces, in front of the central part consisting of the intermediate space ES and the block B3 occupied by the connecting optical fibers FL. This casing renders the distribution frame secure, protects the optical fibers and reduces the risk of environmental pollution of the connections of the optical fiber ends in the connection modules 5.

The top of the block B3 is covered with a removable plate PL the ends of which form in conjunction with the bottom crossbeams 12id of the distribution frames R1 and R2 rectangular holes TR for the connecting fibers FL to pass through. The plate PL is used as a table for carrying out various operations on the optical fiber ends and also protects the connecting optical fibers FL. The plate PL is hinged along the top of two top horizontal beams PO delimiting the space ES relative to the block B3.

"Cross-connection" of optical fibers in the high-capacity distribution frame RGC of the invention is effected in the following manner.

Three numbers identify a point of connection between two optical fibers in the connection module matrix of the first distribution frame R1 or the second distribution frame R2: a number for the connection module support 2, a number for the connection module 5 marked near the hole 23 receiving the latter in the support 2, and a number for the first fiber in a cable CL1 or the second fiber in a cable CL2 marked near the corresponding hole 53 in the connection module 5 receiving the end of the first or second fiber.

For example, and with reference to FIG. 1, the "cross-connection" corresponds to replacing the connection of a given first fiber of cable CF1 to a user equipment A with a connection of the given first fiber CF1 to a user equipment B, which amounts to "cross-connecting" the connecting fiber FLA initially connected to equipment A with equipment B, or with a connecting fiber connected to equipment B.

In the second distribution frame R2 the end of the connecting fiber FLA is marked with the three numbers referred to above. The support 2 containing the connection module 3 at which the fiber FLA identified in this way terminates is pivoted from the inclined rest position PR to the vertical working position PT, abutted against the top crossbeam 12sd. The connection plug FC2 of the connecting fiber FLA is removed from the identified connection module 3 and let go of above the upper end of the strip BA supporting the connecting fibers, onto which it drops. The support 2 containing the identified connection module 3 from which the connecting fiber connection plug FC2 has been withdrawn is pivoted from the working position towards the rest position in the second distribution frame R2.

Then the given first fiber is identified in the connection module matrix in the first distribution frame R1. The support 2 corresponding to the given first fiber is pivoted towards the right from the inclined rest position PR to the vertical working position PT. The connecting fiber FLA connected to the given first network fiber is withdrawn from the set of connecting fibers, substantially from the corresponding connection module 5 identified in this way, without removing the first connection plug FC1 of the connecting fiber FLA from the aforementioned module, as far as the connection plug FC2 of the connecting fiber FLA previously withdrawn from the second distribution frame unit. Without letting go of the connection plug FC2 of the connecting fiber FLA being cross-connected, at the second distribution frame unit R2 end, the support 2 in the first distribution frame unit R1 containing the connection module relating to the given first fiber is pivoted from the working position to the rest position.

In the connection module matrix of the second distribution frame R2, after identifying the end of the second optical fiber of cable CF2 connected to user equipment B, the support 2 containing the connection module 5 at the end of this second fiber is pivoted from the rest position towards the working position in the distribution frame R2. The connection plug FC2 of the connecting fiber FLA being cross-connected and which has not been let go of is fed over the mass of other connecting fibers entering the second distribution frame R2 to prevent tangling, toward the corresponding dripping hole 53 in the connection module 5 of the support 2 in the working position. After plugging the connecting plug FC2 of the connecting fiber FLA into the connection module the support is returned to the rest position.

In a similar way, the various operation steps described above can be repeated on the network side, i.e. relative to a first end FL1 of a connecting fiber in the first distribution frame unit R1, in order to disconnect it from a given first fiber of cable CF1 and connect to another first fiber of cable CF1.

By a succession of a similar steps the cross-connection can equally be effected by totally extracting the connecting fiber to be cross-connected. The ends of the connecting fiber are then disconnected in the first and second matrix distribution frames R1 and R2. The connecting fiber is entirely moved from the distribution frame RGC by extracting it from the last disconnected end. The ends of the connecting fiber are then reconnected, the connecting fiber being positioned over the mass of connecting fibers carried by the suspended strip BA to prevent any tangling.

A connecting fiber can also be extracted totally to eliminate optical continuity between a first network fiber and a second fiber.

Maintenance is easy in the distribution frame RGC of the invention. A connecting fiber FL giving problems can be totally removed and replaced by another connecting fiber. An end FL1, FL2 of a connecting fiber can be connected to the end of first network fiber or a second equipment fiber, as already described, with easy access to the working plate PL above the strip carrying the connecting fibers and with lateral access underneath the plate to the connecting fibers, after opening at least one of the doors V1–V2, and also by virtue of the facility to pivot the supports 2 about the shaft 3.

The capacity of the distribution frame RGC according to the invention is easy to increase because of its two-level modularity, i.e. by adding connection modules 5 to supports 2 already installed and by adding further supports to the distribution frames R1 and R2.

The skilled persons in the art can envisage further arrangements relating to the first and second distribution frames within the scope of the present invention, as a function of the space and availability offered by the room accommodating the high-capacity distribution frame. For example, the first and second distribution frames can be disposed side by side, non-contiguously or separately, or one on top of the other in positions symmetrical about a horizontal plane, or perpendicularly to each other in a horizontal plane.

In some of these arrangement the connecting fibers are not all the same length. Cross-connection is then effected by totally extracting the connecting fiber and fitting another connecting fiber having a length chosen to suit the positions of the connection modules into which the connecting plugs of the connecting fiber must be plugged.

The working positions of the connection module supports 2 are not necessarily in vertical planes or parallel planes.

Figure 10:
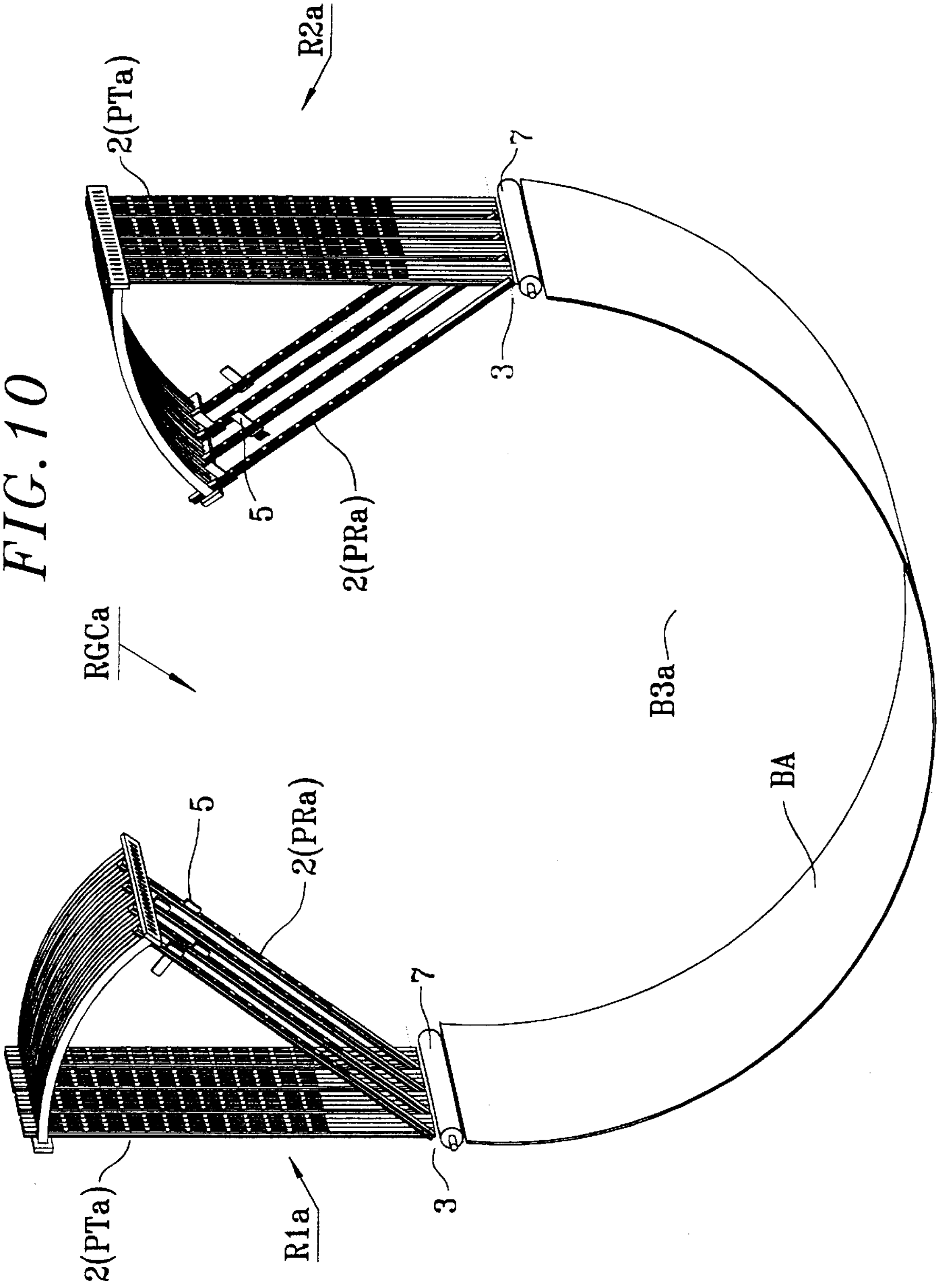
FIG. 10 is a diagrammatic perspective view of the rest and working positions of the connection module supports in first and second distribution frames according to another embodiment.

In a third embodiment of the invention, as shown in FIG. 10, the inclined rest positions PRa of the supports 2 can be between the planes which are vertical in the example shown and which are defined by the working positions PTa and not outside the latter. In this third embodiment the distribution frames R1a and R2a are above the parallelepiped-shape block B3a containing the suspended strip BA for the connecting fibers FL and so the high-capacity distribution frame RGCa is more compact than the distribution frame RGC.

As already stated, the invention also concerns a distribution frame comprising only one matrix stage of connection modules consisting of the distribution frame R1 or R2.

What we claim is:

1. A distribution frame for optical fibers, comprising:

(a) a plurality of connection modules distributed in a matrix arrangement to connect ends of first optical fibers to ends of second optical fibers;

(b) a plurality of supports for supporting respective rows of connection modules extending parallel to two sides of the matrix, said supports having first ends rotatably mounted about a rotation shaft parallel to other two sides of the matrix; and (c) a plurality of circular arcuate guides centered on said rotation shaft for guiding second ends of said supports between a pair of abutments.

2. The distribution frame claimed in claim 1, wherein one of said abutments and said rotation shaft are substantially located in one side of said distribution frame.

3. A distribution frame as claimed in claim 1 comprising partitions between circular sectors swept by said supports when they turn about said rotation shaft.

4. A distribution frame as claimed in claim 1 comprising a roller parallel to and near said rotation shaft.

5. The distribution frame claimed in claim 1 wherein each support includes housings aligned perpendicularly to said rotation shaft and shaped for removably fixing respective connection modules therein.

6. A distribution frame for optical fibers, comprising:

(a) a first distribution frame including connection modules distributed in a matrix arrangement to connect ends of first optical fibers to first ends of connecting optical fibers;

(b) a second distribution frame including connection modules distributed in a matrix arrangement to connect ends of second optical fibers to second ends of the connecting optical fibers, wherein each of said first and second distribution frames comprises a plurality of connection module supports for supporting respective rows of connection modules parallel to two sides of the respective matrix and having first ends rotatably mounted about a rotation shaft parallel to other two sides of said respective matrix; and (c) a strip suspended between said first and second distribution frames, said strip being disposed substantially below said rotation shafts to support the connecting optical fibers.

7. A distribution frame as claimed in claim 6, comprising a working plate removable along one side and extending over said strip carrying said connecting fibers.

8. A distribution frame as claimed in claim 6 including a structure made up of beams, uprights and crossbeams substantially delimiting two parallelepiped-shape blocks containing said first distribution frame and second distribution frame, respectively, and a central third parallelepiped-shape block resting on the floor, in which said connecting optical fibers extend and which is located between said two parallelepiped-shaped blocks.

9. A distribution frame as claimed in claim 6 enclosed in a casing having at least one door providing direct access to an intermediate space located between said first distribution frame and second distribution frame and containing said connecting optical fibers.

10. The distribution frame claimed in claim 6 wherein each of the first distribution frame and second distribution frame comprises an abutment which delimits an end of travel of the supports and which is substantially coplanar with the rotation shaft in one side of the distribution frame.

* * * * *